(12) United States Patent
Tao et al.

(10) Patent No.: US 11,720,601 B2
(45) Date of Patent: Aug. 8, 2023

(54) ACTIVE ENTITY RESOLUTION MODEL RECOMMENDATION SYSTEM

(71) Applicant: SAP SE, Walldorf (DE)

(72) Inventors: Mengyuan Tao, Berlin (DE); Vishal Narender Punjabi, Fremont, CA (US); David Herman, Easton, PA (US)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 16/920,189

(22) Filed: Jul. 2, 2020

(65) Prior Publication Data

US 2022/0004567 A1     Jan. 6, 2022

(51) Int. Cl.
  *G06F 16/28* (2019.01)
  *G06N 20/00* (2019.01)

(52) U.S. Cl.
  CPC ........... *G06F 16/285* (2019.01); *G06N 20/00* (2019.01)

(58) Field of Classification Search
  CPC .. G06F 16/285; G06F 16/245; G06F 16/2455; G06F 16/2457; G06F 16/24578; G06N 20/00
  See application file for complete search history.

(56) References Cited

U.S. PATENT DOCUMENTS

| | | | |
|---|---|---|---|
| 7,720,846 B1 * | 5/2010 | Bayliss | G06F 16/285 707/736 |
| 2013/0124474 A1 | 5/2013 | Anderson | |
| 2015/0261791 A1 * | 9/2015 | Berry | G06F 16/27 707/802 |
| 2015/0356545 A1 * | 12/2015 | Marcuccilli | G06Q 20/322 705/40 |
| 2016/0217119 A1 * | 7/2016 | Dakin | G06F 40/274 |
| 2019/0171655 A1 * | 6/2019 | Psota | G06F 16/24578 |

(Continued)

FOREIGN PATENT DOCUMENTS

EP     3133511 A1     2/2017

OTHER PUBLICATIONS

"European Application Serial No. 201162708.8, Extended European Search Report dated Sep. 13, 2021", 10 pgs.

(Continued)

*Primary Examiner* — Pierre M Vital
*Assistant Examiner* — Jedidiah P Ferrer
(74) *Attorney, Agent, or Firm* — Schwegman Lundberg & Woessner, P.A.

(57) ABSTRACT

Systems and methods are provided for accessing master data comprising a plurality of representative data records, where each representative data record represents a cluster of similar data records, and each similar data record has a confidence score indicating a confidence level that the similar data record corresponds to the cluster, and comparing a new data record to each representative data record of the plurality of representative data records using a machine learning model to generate a distance score. The systems and methods further provide for analyzing the cluster of similar data records corresponding to each representative data record in a selected set of representative data records to generate candidate values for the requested data field of the new data record, and generating a candidate score for each of the candidate values using the distance score and the confidence score to use in providing a recommended candidate value.

20 Claims, 16 Drawing Sheets

(56) References Cited

U.S. PATENT DOCUMENTS

2019/0354625 A1* 11/2019 Toudji .................. G06F 16/248
2020/0151663 A1* 5/2020 Balakrishnan ........ G06F 16/258
2020/0242134 A1* 7/2020 Salhin .................. G06F 16/906

OTHER PUBLICATIONS

Kaplan, Andee, et al., "Posterior Prototyping: Bridging the Gap between Bayesian Record Linkage and Regression", arXiv: 1810.01538v1, (Oct. 12, 2018), 23 pgs.

"De-duplicate and find matches in your Excel spreadsheet or database", [Online]. Retrieved from the Internet: <URL: https://dedupe.io/>, (Accessed Jun. 16, 2020), 12 pgs.

Gregg, Forest, et al., "GitHub—dedupeio/dedupe: a python library for accurate and fuzzy matching, record deduplication and entity-resolution.", Forest Gregg and Derek Eder., [Online]. Retrieved from the Internet: <URL: https://github.com/dedupeio/dedupe>, (2019), 5 pgs.

* cited by examiner

300 ⬉

| Search Results for CD Software 1 – 10 of 105 | Sort by: Relevance ▼ |

[ Post now! ]  ⟨ 1 2 3 ... ⟩

☆ CD SOFTWARE INC
California, United States
   CD Software Inc. trading as CD Cloud, is the global market leader in cloud computing
References: --   Transacting Relationships: 1   Revenue: --

Commodities: Information technology consultation services

Locations: Global

☆ CD SOFTWARE, INC.
California, United States

References: --   Transacting Relationships: 41   Revenue: --

Commodities: Software or hardware engineering Software Business function specific software

Locations: Myanmar, Gibraltar, Cyprus, Malaysia, Brunei Darussalam, Portugal, Greece, Monaco, Luxembourg, Slovenia, Nepal, Ukraine, Moldova, Belarus, Albania, India, Iao People's Democratic Republic, Maldives, B...

☆ CD SOFTWARE

References: --   Transacting Relationships: --   Revenue: --

Commodities:

Locations: Global

☆ CD SOFTWARE INC

References: --   Transacting Relationships: --   Revenue: --

Commodities:

Locations: Global

*FIG. 3*

| | | | | | Search: | |
|---|---|---|---|---|---|---|
| rowId_record | CommodityName_record | EventTitle_record | ItemTitle_record | SupplierName_record | | cnt_cluster |
| 1 | 0 m r o | north sea – upsc – firefighting equipment rfp | ba log book | | | 3 |

Showing 1 to 1 of 1 entries

Previous | 1 | Next

Choose a record id:
0
Unique id:
rowId
Field to recommend
SupplierName

| rowId | Cluster_r | Confidence | Company Taxonomy 2009_Nodekey | Supplier Address 1 | Supplier City |
|---|---|---|---|---|---|
| 360012 | 43623 | 0.999969962 | 152674753.0 | po box 660794 | dallas |
| 360013 | 43623 | 0.999969962 | 152674753.0 | po box 660794 | dallas |
| 360014 | 43623 | 0.999969962 | 152674753.0 | po box 660794 | dallas |
| 360015 | 43623 | 0.999969962 | 152674753.0 | po box 660794 | dallas |
| 360016 | 43623 | 0.999969962 | 152674753.0 | po box 660794 | dallas |
| 360024 | 43623 | 0.999969962 | 152674753.0 | po box 660794 | dallas |
| 360032 | 43623 | 0.999969962 | 152674753.0 | po box 660794 | dallas |
| 360033 | 43623 | 0.999969962 | 152674753.0 | po box 660794 | dallas |
| 360034 | 43623 | 0.999969962 | 152674753.0 | po box 660794 | dallas |
| 360035 | 43623 | 0.999969962 | 152674753.0 | po box 660794 | dallas |
| 360036 | 43623 | 0.999969962 | 152674753.0 | po box 660794 | dallas |
| 360037 | 43623 | 0.999969962 | 152674753.0 | po box 660794 | dallas |
| 360038 | 43623 | 0.999969962 | 152674753.0 | po box 660794 | dallas |
| 360039 | 43623 | 0.999969962 | 152674753.0 | po box 660794 | dallas |
| 360041 | 43623 | 0.999969962 | 152674753.0 | po box 660794 | dallas |
| 360042 | 43623 | 0.999969962 | 152674753.0 | po box 660794 | dallas |
| 360043 | 43623 | 0.999969962 | 152674753.0 | po box 660794 | dallas |
| 360044 | 43623 | 0.999969962 | 152674753.0 | po box 660794 | dallas |

604

| Cluster_rowId | Company Taxonomy | Supplier Address 1 | Supplier City | Supplier Countr | Supplier Loc | Supplier Name |
|---|---|---|---|---|---|---|
| 43623 | 152674753.0 | po box 660794 | dallas | us | | verizon |

*FIG. 6A*

| Supplier Country ▼ | Supplier Location ▼ | Supplier Name ▼ | Supplier Postal Code ▼ | Supplier State ▼ | realmID ▼ |
|---|---|---|---|---|---|
| | | verizon business | 75266-0794 | tx | mem0271 |
| | | verizon business acct | 75266-0794 | tx | mem0271 |
| | | verizon business acct. # y 2715289 | 75266-0794 | tx | mem0271 |
| | | verizon business acct. #y 2743576 | 75266-0794 | xt | mem0271 |
| | | verizon business acct. y 2743565 | 75266-0794 | tx | mem0271 |
| | | verizon business network | 75266-0794 | tx | mem0271 |
| | | verizon acct. # y 2743487 | 75266-0794 | | mem0271 |
| | | verizon acct. # y 2744591 | 75266-0794 | | mem0271 |
| | | verizon acct. # y 2743132 | 75266-0794 | | mem0271 |
| | | verizon acct. # y 2744594 | 75266-0794 | | mem0271 |
| | | verizon acct. # y 2747211 | 75266-0794 | | mem0271 |
| | | verizon acct. # y 2747212 | 75266-0794 | | mem0271 |
| | | verizon business- acct. y 2743565 | 75266-0794 | | mem0271 |
| | | verizon acct. # y 2742518 | 75266-0794 | | mem0271 |
| | | verizon business | 75266-0794 | | mem0271 |
| | us | verizon business | 75266-0794 | | mem0271 |
| | us | verizon business acct. | 75266-0794 | | mem0271 |
| | us | verizon business acct. #y 2743576 | 75266-0794 | | mem0271 |

| Supplier Postal Code | Supplier state | realmID |
|---|---|---|
| 75266-0794 | tx | mem0271 |

Matched_cluster

Show [10 ▼] entries 708

Search: [        ]

| | Cluster_rowId | Confidence.x | CommodityName | EventTitle_canon | ItemTitle_canon | SupplierName_canon |
|---|---|---|---|---|---|---|
| 702 — 1 | 43 | 0.913028121 | m r o | north sea – upsc – firefighting equipment rfp | draeger pp15 ba escape set, sintered filter 10 pack | tyco fire & integrated solutions (uk) ltd |
| 704 — 2 | 252 | 0.738834441 | m r o | north sea – upsc – firefighting equipment rfp | draeger pp15 ba escape set, sintered filter 10 pack | kbr |
| 706 — 3 | 109 | 0.678548217 | safety and security equipment | north sea – upsc – firefighting equipment rfp | draeger pp15 ba escape set, sintered filter 10 pack | tyco fire & integrated solutions (uk) ltd |

Showing 1 to 3 of 3 entries

Previous [1] Next

*FIG. 7A*

Show [10] entries     Search: [        ]

| Cluster_rowId | Confidence.y | rowId.y | Commodity Name | EventTitle | ItemTitle | SupplierName |
|---|---|---|---|---|---|---|
| 1 | 43 | 0.9281702960925780 | 40677 | m r o | north sea – upsc – firefighting equipment rfp | type: co² size:5kg | hawkes fire |
| 2 | 43 | 0.9281702960925780 | 5823 | m r o | north sea – upsc – firefighting equipment rfp | 82ab1002 | tyco fire & integrated solutions (uk) ltd |
| 3 | 43 | 0.9281702960925780 | 36685 | m r o | north sea – upsc – firefighting equipment rfp | 82ac8005 | tyco fire & integrated solutions (uk) ltd |
| 4 | 43 | 0.9281702960925780 | 6273 | m r o | north sea – upsc – firefighting equipment rfp | Firefighting boots size 8 | tyco fire & integrated solutions (uk) ltd |
| 5 | 43 | 0.9281702960925780 | 37982 | m r o | north sea – upsc – firefighting equipment rfp | 82ac2112 | hawkes fire |
| 6 | 43 | 0.9281702960925780 | 9328 | m r o | north sea – upsc – firefighting equipment rfp | 82ac2032 | chubb |
| 7 | 43 | 0.9281702960925780 | 8973 | m r o | copy 1 bp georgia, rfp, 361337, gps map | Line item 1, pr 361337 | transtransit ltd |
| 8 | 43 | 0.9281702960925780 | 19894 | m r o | north sea – upsc – firefighting equipment rfp | 10062071 | tyco fire & integrated solutions (uk) ltd |
| 9 | 43 | 0.9281702960925780 | 40398 | m r o | north sea – upsc – firefighting equipment rfp | 82ac8001 | hawkes fire |
| 10 | 43 | 0.9281702960925780 | 28955 | m r o | north sea – upsc – firefighting equipment rfp | Firefighting boots size 7 | chubb |

Showing 1 to 10 of 1,017 entries     Previous  [1] 2 3 4 5 ... 102  Next

FIG. 8

Recommendation

Show [10 ▼] entries                                     Search: [        ]

| # | SupplierName | mean_confidence | cnt_cluster | cnt_record |
|---|---|---|---|---|
| 1 | hawkes fire | 0.9286185899902934 | 2 | 330 |
| 2 | tyco fire & integrated solutions (uk) ltd | 0.9286132211114786 | 2 | 334 |
| 3 | chubb | 0.9286082224728128 | 2 | 346 |
| 4 | r&m electrical group ltd | 0.9281702950925783 | 1 | 1 |
| 5 | transtransit ltd | 0.9281702960925783 | 1 | 1 |
| 6 | bp america test supplier | 0.7888398547172855 | 1 | 2 |

FIG. 9

Master data of catalog items:

| Account Name | Company | Business L | Commodity Name | ERP Com | ERP Commodity Name |
|---|---|---|---|---|---|
| LEASED LINES-OTHER | SG100001 | | Phone headsets | 43191609 | Phone headsets |
| 53311001-MARKET DATA S | TH300002 | | Toilet tissue | 14111704 | Toilet tissue |
| 53311001-MARKET DATA S | TH100001 | | Toilet tissue | 14111704 | Toilet tissue |
| Telecom exp-Equipment-Mo | B3700 | | Phone headset ear or | 43191607 | Phone headset ear or |
| Prem&eqpmnt-Cost-Purch | B3712 | | Notebook computers | 43211503 | Notebook computers |
| 53301000-STAT&PRINT-ST | SHE00041 | | Stationery | 14111509 | Stationery |
| 53301000-STAT&PRINT-ST | SHE00001 | | Stationery | 14111509 | Stationery |
| Software – Direct Purchase | B3801 | | Data base management | 43232304 | Data base management |
| SUP-MOV EQUO & CAP IM | SHE00021 | | Phone headsets | 43191609 | Phone headsets |

Matching results of non-catalog items:

| Cost Center | Cost Center Description | Account Name_record | Company ID | Commodity Name_reco | ERP Commod |
|---|---|---|---|---|---|
| ddabaambca | events hong kong laef 04 | prem&eqpmnt-cost-punch | b3712 | notebook computers | 43211503 |
| sbacbfd | am compliance - hic | prem&eqpmnt-cost-punch | b3712 | notebook computers | 43211503 |
| ddabaalaef | coo hong kong-44613 | prem&eqpmnt-cost-punch | b3712 | notebook computers | 43211503 |
| ddabaambca | events hong kong laef 04 | prem&eqpmnt-cost-punch | b3712 | notebook computers | 43211503 |
| ddabaambca | events hong kong laef 04 | prem&eqpmnt-cost-punch | b3712 | notebook computers | 43211503 |
| ddabaambca | events hong kong laef 04 | prem&eqpmnt-cost-punch | b3712 | notebook computers | 43211503 |

FIG. 10B

Master data of catalog items:

| Line Type | Ship To Lo |
|---|---|
| Catalog Item | Singapore |
| Catalog Item | Thailand |
| Catalog Item | Thailand |
| Catalog Item | Hong Kong, China |
| Catalog Item | Hong Kong, China |
| Catalog Item | China |
| Catalog Item | China |
| Catalog Item | Singapore |
| Catalog Item | China |

Matching results of non-catalog items:

| ERP Commodity Name | Line Type_record | Ship To Location_record |
|---|---|---|
| notebook computers | non-catalog item | hong kong, china |
| notebook computers | non-catalog item | hong kong, china |
| notebook computers | non-catalog item | hong kong, china |
| notebook computers | non-catalog item | hong kong, china |
| notebook computers | non-catalog item | hong kong, china |
| notebook computers | non-catalog item | hong kong, china |

FIG. 10C

ACTIVE ENTITY RESOLUTION MODEL RECOMMENDATION SYSTEM

BACKGROUND

Data record duplicates or replications exist in many workspaces in systems, such as procurement and supply chain systems. For example, duplicate records for a same supplier may exist in the same system. When there are duplicate data records, it is difficult for a user to search for a supplier in such a system, and it causes data in the database containing that data to be messy and incomplete. Further, for supplier sourcing for goods or services, many sourcing events are similar in item and commodity, but currently there is no autonomous step to make it easier to create a sourcing event to find a supplier for a good or service.

BRIEF DESCRIPTION OF THE DRAWINGS

Various ones of the appended drawings merely illustrate example embodiments of the present disclosure and should not be considered as limiting its scope.

FIG. 3 illustrates an example graphical user interface (GUI) showing duplicate data records, according to some example embodiments.

FIG. 5 illustrates an example GUI for entering a new data record, according to some example embodiments.

FIGS. 6A and 6B illustrate an example cluster and representative data record, according to some example embodiments.

FIGS. 7A and 7B illustrate a selected set of representative data records, according to some example embodiments.

FIG. 8 illustrates a list of similar data records, according to some example embodiments.

FIG. 9 illustrates example recommendations for suppliers, according to some example embodiments.

FIGS. 10A-10C illustrate example matching results of non-catalog items, according to some example embodiments.

DETAILED DESCRIPTION

Systems and methods described herein relate to an active entity resolution (AER) model system, and specifically, an AER model recommendation system. As explained above, data record duplicates or replications exist in many workspaces in systems, such as procurement and supply chain systems. For example, duplicate records for a same supplier may exist in the same system. When there are duplicate data records, it is difficult for a user to search for a supplier in such a system and it causes data in the database containing that data to be messy and incomplete. Further, for supplier sourcing for goods or services, many sourcing events are similar in item and commodity, but currently there is no autonomous step to make it easier to create a sourcing event to find a supplier for a good or service.

Example embodiments provide for an AER model system that detects duplicate data records in a data store and clusters the duplicate data records together into clusters of similar data records. The AER model system generates a canonical record or representative data record for each cluster and stores the representative data records as master data. The AER model system uses the master data to provide recommendations for a new data record or requested data field by matching a new data record with the master data.

Figure 1:
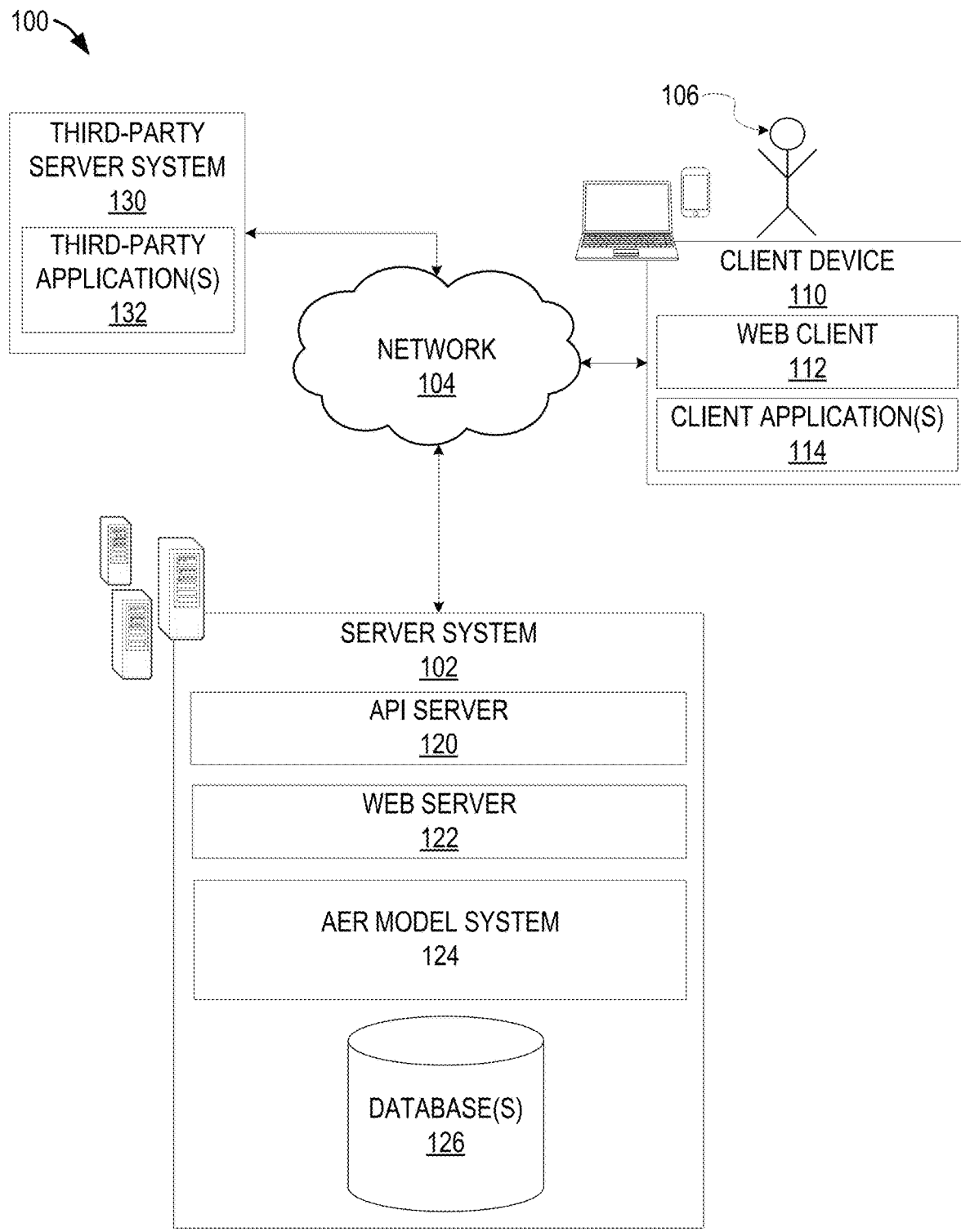
FIG. 1 is a block diagram illustrating a networked system, according to some example embodiments.

For example, example embodiments described herein provide for receiving, at a computing system, a requested data field of a new data record. The computing system accesses master data comprising a plurality of representative data records. Each representative data record represents a cluster of similar data records, and each similar data record has a corresponding a confidence score indicating a confidence level that the similar data record corresponds to the cluster. The computing system compares the new data record to each representative data record of the plurality of representative data records using a machine learning model to generate a distance score, for each representative data record, corresponding to a distance between the new data record and each representative data record. The computing system selects a set of representative data records having a generated distance score within a distance threshold and analyzes the cluster of similar data records corresponding to each representative data record in the set of representative data records to generate candidate values for the requested data field of the new data record. The computing device generates a candidate score for each of the candidate values using the distance score for the representative data record to which the candidate value corresponds and the confidence score for the similar data record to which the candidate value corresponds, and provides a recommendation for the requested data field based on the candidate scores for the candidate values FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110. In one example, the user is a developer of one or more applications (e.g., mobile and desktop web applications) or a quality assurance engineer.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, a procurement, spend management and supply chain services application, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access software version information, access an ERP system, access a CRM system, access machine learning models, access procurement, spend management and supply chain services, to authenticate a user 106, to verify a method of payment, access test data, and so forth), to search for a supplier, for catalog or non-catalog requisitions, and so forth. Conversely, one or more applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and an AER model system 124 that may be communicatively coupled with one or more databases 126.

The one or more databases 126 may be storage devices that store data related to users of the system 100, applications associated with the system 100, cloud services, machine learning models, and so forth. The one or more databases 126 may further store information related to third-party server system 130, third-party applications 132, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The AER model system 124 may provide back-end support for third-party applications 132 and client applications 114, which may include cloud-based applications. The AER model system 124 may provide for generation of recommended suppliers for sourcing events, confirming an ad hoc request is not available in a catalog, and so forth, as described in further detail below. The AER model system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In one example, a third-party server system 130 is a system associated with an entity that accesses cloud services via server system 102.

Figure 2:
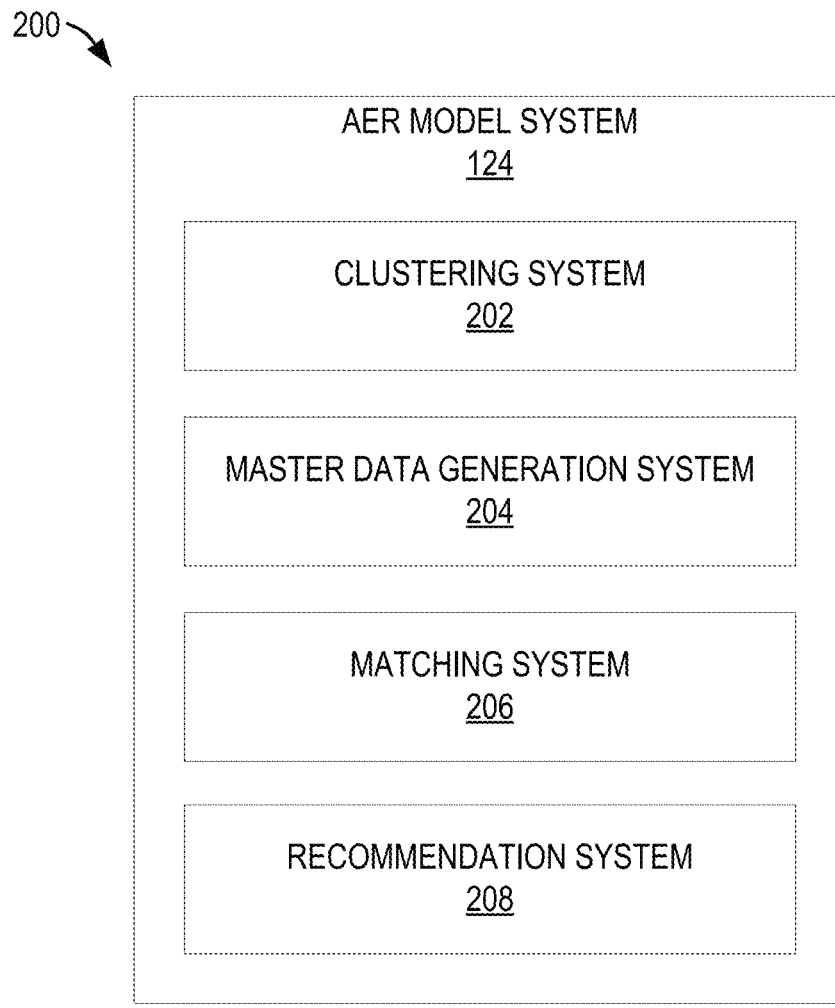
FIG. 2 is a block diagram illustrating an active entity resolution (AER) model system, according to some example embodiments.

FIG. 2 is a block diagram illustrating further details of an AER model system, according to some example embodiments. The AER model system 124 uses advanced machine learning and statistics and learns the best way to identify similar records in any dataset. The AER model system 124 clusters similarity in a database and creates canonical data or master data to maintain a healthy system. Moreover, the AER model system 124 matches a new record against the master data to make recommendations (e.g., supplier recommendations). The AER model system 124 can be adopted by different applications that suffer from duplications or that can benefit from a clustering and recommendation model. The AER model system 124 can be used in different applications, such as sourcing supplier recommendation, catalog and off-catalog matching, and so forth.

FIG. 3 illustrates an example graphical user interface (GUI) 300 showing search results for "CD Software" that results in many duplicate records due to poorly managed accounts with sparse information in a supplier profile. These duplicate records cause confusion in a search.

The AER model system 124 comprises a clustering system 202 that detects duplicate data records in a dataset or database and clusters them together, as explained in further detail below. For example, in a procurement, spend management and supply chain services system, such as SAP Ariba, the AER model system 124 can cluster similar data records in the existing Ariba Network database.

After similar data is clustered together by the clustering system 202, a master data generation system 204 creates a canonical record or representative data record for each cluster. For example, the master data generation system 204 creates a master record, or representative data record, for several duplicate data records (e.g., supplier accounts in the Ariba Network), to ensure the dataset is clear and clean. The representative data records, which each correspond to a cluster, make up the master data discussed further below.

The matching system 206 matches a new data record to the existing master data. This allows the AER model system 124 to catch duplicates as they are created and also to find one or more clusters comprising data records similar to the new record to provide recommendations according to similar data records in the same cluster (e.g., for missing or requested data fields in the new data record).

The recommendation system 208 retrieves similar data records of the one or more clusters that the matching system 206 found to comprise data records similar to a new record and analyzes the similar data records to rank them by a confidence score (or candidate value score) based on the confidence of the data in the cluster and the confidence score of the new data that was matched to the cluster. To recommend a specific field, the recommendation system 208 retrieves all possible values for the specific field in the similar data records and ranks them based on the frequency of the value and the confidence score of all the records that have the same value, as described in further detail below. The recommendation system 208 can provide a recommendation, such as a top-n (e.g., top 1, 3, 5) recommendation according to the confidence score, or return all the results.

Accordingly, the AER model system 124 can start with a messy dataset that contains numerous duplicate data records and block data together using machine learning modeling, such as logistic regression, to find the best weights for identified fields in the data records. The AER model system 124 can employ labeling by Active Learning, in one example embodiment. In one example embodiment, the AER model system 124 calculates similarity with string metrics and uses a grid search to find the best threshold for clustering. It is to be understood that other clustering methods can be used in example embodiments. For each cluster, the AER model system 124 extracts canonical information to generate a representative data record for each cluster. The AER model system 124 can then use the master data comprising the representative data records to match new data to the canonical data set, generate recommendations according to similar data points, among other use cases and applications.

In one example embodiment, the clustering system 202 comprises a deduper model (generated from clustering) and a matching model (generated from matching). These two models can be created based on functionality provided by the Python dedupe library or other similar technology. In one example embodiment, the recommendation system 208 is built to use results from these two models.

For example, when the process of clustering or matching is initiated, the AER model system 124 will initiate the deduper model and/or the matching model depending on the conditions provided when initiating clustering or matching. For instance, if a user provides input data (e.g., messy data) to be clustered, the AER model system 124 will first create the deduper model and generate the master data by performing clustering. The AER model system 124 will also use the input data to create a matching model if the user did not provide new data to be matched. In the case where the master data is already generated, a user may provide new input data to be matched to the master data and the AER model system 124 will only need to create the matching model. The following is example pseudocode that includes two processes. The first process is a cluster process that will be run in the scenario where the user provides input data to be clustered. The second process is a match process that will be run in the scenario where the master data is already generated and the user has provided new input data to be matched to the master data. The "deduper.main" refers to the deduper model and the "gazetteer.main" refers to the matching model.

```
cluster_process = True if model.cluster_input_gcs or model.cluster_input_file or
model.cluster_db_table or model.cluster_input_hdfs else False
match_process = True if model.match_input_gcs or model.match_input_file or
model.match_db_table or model.match_input_hdfs else False
if cluster_process:
    try:
        print('--------------------------------')
        logger.info('DEDUPE STARTED')
        model = deduper.main(exp, params, artifacts)
        logger.info('DEDUPE FINISHED.')
        if not match_process:
            model.match_input_gcs = model.cluster_input_gcs
            model.match_input_file = model.cluster_input_file
            model.match_input_hdfs = model.cluster_input_hdfs
            model.match_db_table = model.cluster_db_table
            print('--------------------------------')
            logger.info('MATCH STARTED')
            model = gazetteer.main(exp, params, artifacts)
            logger.info('MATCH FINISHED')
    except Exception as error:
        logger.error(repr(error))
elif match_process and model.canonicals:
    try:
        print('--------------------------------')
        logger.info('MATCH STARTED')
        model = gazetteer.main(exp, params, artifacts)
        logger.info('MATCH FINISHED')
    except Exception as error:
        logger.error('MATCH NOT COMPLETED BECAUSE: ' + repr(error))
```

Continuing with this example, once the two models (deduper model and matching model) are created, then the recommendation model of the recommendation system 208 can be created. Some example pseudocode for using the recommendation system to generate a recommendation includes: recommendation=model.predict(data, match_field), where data is a dictionary with the fields and values of the new data point to recommend and match_field is the field for which a recommendation is requested. If match_field is "None," then recommendation results will comprise all records in the same cluster, as explained in further detail below.

As explained above, the AER model system 124 can be used in various use cases and applications. One example use case is a search for an existing supplier. When a user enters terms to search for an existing supplier in a dataset, the AER model system 124 identifies matches of existing suppliers using string metrics, for example, such as an Affine Gap distance (e.g., street versus st, and avenue versus ave). Further, the AER model system 124 can define the importance of different fields, such as by assigning a higher weight to an email address domain field than a supplier name field. The AER model system 124 can also match other new records, such as matching a new customer record to an existing customer record during a customer registration process.

Another example use case is recognizing duplicate accounts. For example, the AER model system 124 can use matching logic such as an exact match for fields or a partial match for fields. For an exact match for fields, the AER model system 124 can match data records based on a name match only, VAT/TAX DUNS Match, exact email match, and so forth, and return a 0 if a given value and a matched value are completely different or one or both are full of blank or empty or null fields, and the AER model system 124 can return a 100 if the given value and the match vale are an exact match. The AER model system 124 can cluster duplicate accounts as explained above.

The AER model system 124 can also be used in invoicing. For example, the AER model system 124 can be used to address deduping, such as address dedupe. For instance, there are many addresses in uploaded invoices that have small differences but refer to the same address. Conventional invoicing systems cannot detect these differences and will create a new record in the system. The AER model system 124 can cluster these similar addresses and create a master dataset for the addresses.

The AER model system 124 can also be used in customer service systems, such as customer service ticketing systems. In these types of systems, suppliers submit tickets when they have questions or problems, and many submitted tickets are similar to each other. The sheer volume of tickets alone makes it very difficult to manually review and classify. The AER model system 124 can cluster similar tickets and prioritize the tickets according to the number and importance of the tickets in the same cluster so that a support agent knows which ticket to resolve first.

Another example use case is for supplier or other specified or missing data field recommendation. For example, when a user enters a new record that has left a data field blank or has requested a recommendation for a specified data field, the AER model system 124 can provide a recommendation for the specified missing data field, as explained in further detail below with respect to FIG. 4. In one example embodiment, the AER model system 124 can cluster similar sourcing events. When a user enters a new record for a sourcing event, the AER model system 124 can recommend one or more suppliers that are most relevant in a cluster to a buyer. The recommendation can be based on the sourcing event information, such as item title, event title, and commodity name, and also on supplier transaction history. The AER model system 124 can cluster duplicates and match new records to an existing cluster and then use the recommendation system 208 to recommend one or more values for the field according to data records in the same cluster.

The AER model system 124 can further be used for catalog versus non-catalog requisitions to confirm that an ad hoc request for an item is not available in a catalog, as described in further detail below.

Figure 4:
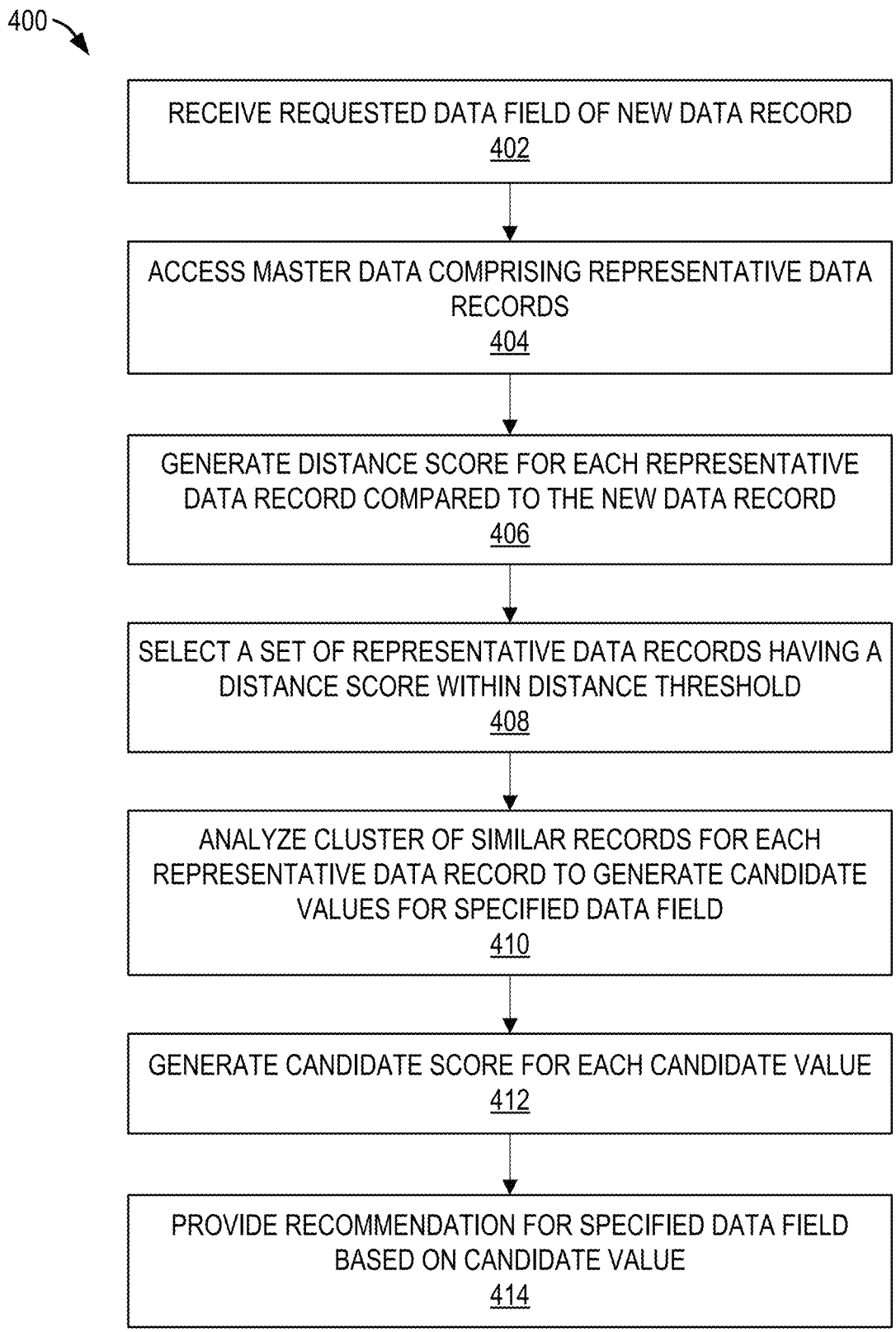
FIG. 4 is a flow chart illustrating aspects of a method for generating a recommendation for a requested field of a new data record, according to some example embodiments.

As explained above, the recommendation system 208 of the AER model system 124 can be used to recommend a supplier for sourcing events. FIG. 4 is a flow chart illustrating aspects of a method 400 for generating a recommendation for a specified or missing data field (e.g., supplier), according to some example embodiments. For illustrative purposes, method 400 is described with respect to the block diagrams of FIG. 1 and FIG. 2. It is to be understood that method 400 may be practiced with other system configurations in other embodiments.

Before the recommendation is generated, a model of the recommendation system 208 is trained based on history sourcing events data records on specified fields of the data records, such as commodity name, event title, ship-to-location, supplier name, and so forth. Then cluster results and master data are generated and saved to one or more data stores, as explained above. For a new sourcing event that is created with no supplier, the model of the recommendation system 128 will use the existing data in the new record to match to the master data and find the clusters to which the new data record is matched.

In operation 402, a computing system (e.g., server system 102 or AER model system 124) receives a requested data field of a new data record. The requested data field of the new data record may be a specified data field or a missing data field. For example, a user may enter information for a new data record in a user interface on a computing device (e.g., client device 110). The user may specify a data field for which the user would like a recommendation or may submit the new record with a data field for which no information was entered (e.g., a missing data field) to request or receive a recommendation for the specified or missing data field. The specified or missing data field is referred to herein as a requested data field.

FIG. 5 illustrates an example GUI 500 that allows a user to input various fields 502 (e.g., commodity name, event title, item title, supplier name, etc.) for a new data record 504. The user may simply leave a field blank (e.g., supplier record 506) when submitting the new data record 504 or the user may specify a field to be recommended in a separate input area 508. In one example the requested data field is a supplier name. It is to be understood that the requested data field may be other data fields in example embodiments. The user can submit the request for the recommendation for the requested field and the computing device will send the new data record and requested field to the computing system.

Returning to FIG. 4, the computing system accesses master data comprising representative data records, in operation 404. For example, the computing system accesses one or more data stores (e.g., database(s) 126) to access the master data. The master data comprises a plurality of representative data records. Each representative data record represents a cluster of similar data records. Each similar data record has a corresponding confidence score indicating a confidence level that the similar data record corresponds to the cluster.

The master data may be generated as explained above with respect to FIG. 2 and the master data generation system 204. To generate the master data, the computing system accesses a data source (e.g., database 126, a database associated with a third-party server system 130, and/or other data source) comprising a plurality of data records. The computing system groups the data records into clusters comprising similar data records. In one example embodiment, the computing system calculates the probability that pairs of data records are duplicates (e.g., similar data records) and then transforms the pairs of duplicate records into clusters of duplicate records (e.g., clusters of similar data records).

When grouping the duplicated records into clusters, the computing system uses a defined threshold indicating a distance of the points to a centroid, in one example embodiment. The defined threshold is determined by making a trade-off between precision and recall. For example, precision and recall of a subset of data records, for which duplication is known, can be analyzed to define the threshold. The labeled example subset data records should be representative of data records which the computing system is trying to classify. One technical problem when using active learning to train a model to classify the clusters is that, by design, in the active learning step, the system is not trying to find the most representative data record examples but instead trying to find the ones that will teach the model the most. Accordingly, a random sample of blocked data records is taken to calculate a pairwise probability that the data records will be duplicates within each block. From these probabilities the computing system can calculate the expected number of duplicates and distinct pairs, so that the expected precision and recall can be calculated.

The computing system generates a representative data record for each cluster of similar data records. For example, for each cluster the computing system extracts information from all of the similar data records in the cluster into one canonical record (representative data record) that can be most representative of the cluster. The canonical record is generated field by field of the similar data records. Some example methods to extract the canonical record from the cluster include centroid, mode, longest. It is to be understood that any of these methods, and/or other methods, can be used in example embodiments.

The computing system generates a confidence score for each similar data record indicating the confidence level that the similar data record corresponds to the cluster (e.g., the estimated probability that the data records refer to the same entity). The Python dedupe library (e.g., dedup.io) or other methods can be used for generating a confidence score in example embodiments. Each data record is matched to none, one, or more than one canonical record based on the confidence score. If a data records is not matched to any canonical record for clustering, a cluster will be created just for the data record.

FIGS. 6A and 6B (split into two figures for readability) illustrate an example 600 including a cluster 602 of similar data records in a supplier profile use case. Each similar data record comprises a number of fields, such as a row identifier, a cluster number, a confidence score, a supplier address, a supplier name, and so forth. FIGS. 6A and 6B further illustrate a representative data record 604 for the cluster 602. In this example, the representative data record 604 comprises several fields, such as a cluster identifier, a company taxonomy, a supplier address, a supplier name, and so forth.

The computing system stores the master data comprising the plurality of representative data records in one or more data stores (e.g., database(s) 126).

Returning to FIG. 4, in operation 406, the computing system generates a distance score for each representative data record compared to the new data record, to determine whether the new data record matches one or more representative data records. For example, the computing system compares the new data record to each representative data record using a machine learning model to generate a distance score, for each representative data record, corresponding to a distance between the new data record and each representative data record. Some example methods for generating a distance score include Affine Gap distance, cophenetic distance, and the like.

In operation 408, the computing system selects a set of representative data records having a generated distance score within a distance threshold. For example, a distance threshold can be a specified threshold value. For instance, a confidence score may be between 0 and 1. And the distance threshold may be specific value such as 0.9, 0.95, 0.8, and so forth. Using an example distance threshold of 0.9, the computing system would select the representative data records that have a distance score of 0.9 or higher. This may be only one representative data record; there may be three representative data records, or another number of representative data records. In one example, there may be a maximum number n of representative records that may be selected (e.g., 1, 2, 3, 5) and, in this example, the top n records (e.g., with the highest distance scores) would be selected as the set of representative data records. In one example, only one representative data record is selected (e.g., the data record with the highest distance score).

Figure 7B:

FIGS. 7A and 7B (split into two figures for readability) illustrate an example GUI 700 with a list of representative data records that were matched to the new data record 504 of FIG. 5. In this example, three representative data records 702, 704, and 706 were matched to the new data record 504 and are each associated with a respective distance score 708. For instance, representative data record 702 corresponds to cluster 43 and has distance score of 0.913028121, representative data record 704 corresponds to cluster 252 and has a distance score of 0.738834441, and representative data record 706 corresponds to cluster 109 and has a distance score of 0.678548217.

Returning to FIG. 4, the computing system analyzes the cluster of similar data records corresponding to each representative data record in the set of representative data records to generate candidate values (e.g., supplier name or other field) for the requested data field of the new data record, in operation 410. For example, if a recommendation for a supplier name is requested, the computing system determines the supplier name in each of the similar data records in the cluster of similar data records for each representative data record, as a candidate value. While a supplier name is used as an example use case, it is to be understood that a different field may be requested, and candidate values related to the different field can be generated in example embodiments.

In operation 412, the computing system generates a candidate score for each of the candidate values using the distance score for the representative data record to which the candidate value corresponds, and the confidence score for the similar data record to which the candidate value corresponds. For example, for each similar record, the computing system multiplies the distance score (cf1) by the confidence score (cf2) to generate a multiplied value. For each candidate value, the computing system combines the multiplied value of each similar record comprising the candidate value to generate a combined multiplied value. The computing device determines a count of the number of similar records in which each candidate value appears and generates the candidate score for each of the candidate values based on the combined multiplied value and the count for the candidate value (e.g., calculating an average using the combined multiplied value and the count for the candidate value): candidate score=avg(cf1*cf2).

To use a specific example, FIG. 8 illustrates an example 800 including list of similar data records 802 in the three clusters 43, 252, and 109 shown in FIGS. 7A and 7B, matched to the new data record 504 of FIG. 5. In the table shown in FIG. 8, only the first page 810 of similar data records 802 is shown. As can be seen, there are over a hundred pages of similar data records 802. The first page 810 comprises ten similar data records 802 that correspond to cluster 43 as indicated in the cluster number column 804. In this example, the candidate values are the supplier names listed in the supplier name column 808. For example, "hawkes fire" is a first candidate value, "tyco fire & integrated solutions (uk) ltd" is a second candidate value, and so forth.

For each similar data record 802 (in all the pages), the computing system multiplies the distance score by the confidence score to generate a multiplied value. Using the first similar data record 812 as an example, the confidence score 0.928170296092578 is multiplied by the confidence score for cluster 43 (shown in FIGS. 7A and 7B) of 0.913028121 to get the multiplied value of 0.8474455814094201. The computing system does this for each similar data record 802 in all pages and then combines the multiplied value of each similar data record for the same candidate values. For example, there are multiple similar data records with the candidate value "hawkes fire." The computing system would take the multiplied value for each "hawkes fire" similar data record and combine (add) them together.

The computing device determines a count for the number of "hawkes fire" similar data records and generates the candidate score for "hawkes fire" using the combined multiplied value and the count for "hawkes fire" (e.g., the average of the multiplied value for each "hawkes fire" or combined multiplied value/count).

FIG. 9 illustrates an example 900 comprising a list 902 of the top ranked candidate values, or supplier names in this example. The list comprises the supplier name 910, the candidate score 904, the cluster count 906, and the count 908 of the number of similar records in which each candidate value appears. For example, for supplier name "hawkes fire" the candidate score is 0.928618589902934 and it appears in two clusters (per cluster count 906) and 330 similar data records.

Example pseudocode for a recommendation for a requested field in the new data record is as follows:

```
Data:
{
    "EventTitle": "bp azerbaijan pr 365690 provision of valve",
    "CommodityName": "valves",
    "ItemTitle": "special packing (for all items combined)"
}
Match_field: SupplierName
Recommendation result:
{
    "munasib senaye techizat ltd": {
        "confidence": 1.0,
        "cnt_clusters": 1,
        "cnt_records": 1,
        "records": {
            "0": {
                "AER_Unique_RowId": 12281,
                "Cluster_AER_Unique_RowId": 9834,
                "Confidence": 1.0,
                "EventTitle": "bp azerbaijan pr 365690 provision of valve"
                "CommodityName": "valves",
                "ItemTitle": "special packing (for all items combined)",
                "SupplierName": "munasib senaye techizat ltd"
            }
        }
    },
    "national oilwell varco (nov)": {
        "confidence": 1.0,
        "cnt_clusters": 1,
        "cnt_records": 1,
        "records": {
            "0": {
                "AER_Unique_RowId": 12282,
                "Cluster_AER_Unique_RowId": 9834,
                "Confidence": 1.0,
                "EventTitle": "bp azerbaijan pr 365690 provision of valve",
                "CommodityName": "valves",
                "ItemTitle": "special packing (for all items combined)",
                "SupplierName": "national oilwell varco (nov)"
            }
        }
    },
    "petrolvalves (g.b.) ltd": {
        "confidence": 1.0,
        "cnt_clusters": 1,
        "cnt_records": 1,
        "records": {
            "0": {
                "AER_Unique_RowId": 12283,
                "Cluster_AER_Unique_RowId": 9834,
```

-continued

```
            "Confidence": 1.0,
            "EventTitle": "bp azerbaijan pr 365690 provision of valve",
            "CommodityName": "valves",
            "ItemTitle": "special packing (for all items combined)",
            "SupplierName": "petrolvalves (g.b.) ltd"
          }
        }
      }
}
```

Returning to FIG. 4, in operation 414, the computing system provides a recommendation for the requested data field based on the candidate scores for the candidate values. For example, the computing system can provide all of the recommendations or the top-n recommendation (e.g., top 1, 3, 6). For example, the computing system can provide the candidate value with the highest candidate score or the highest candidate score based on a predetermined number of recommendations to be provided. The example in FIG. 9 shows the top six recommendations. The computing system can provide the recommendation(s) to the computing device to be displayed on the computing device.

In one example embodiment, the computing system ranks the candidate values based on the candidate scores and provides the recommendation for the recommended field based on the top ranked candidate values (e.g., the top ranked candidate value, the top 3 ranked candidate values, etc.). In one example embodiment, the ranking is done by the candidate score alone. In another example embodiment, the ranking is done using one or more criteria comprising the candidate score, the cluster count indicating the number of clusters in which the candidate value appears, or the record count indicating the number of similar records in which the candidate value appears. In one example embodiment, the candidate values are ranked first based on candidate score, second based on cluster count indicating the number of clusters in which the candidate value appears, and third based on the record count indicating the number of similar records in which the candidate value appears.

As explained above, another use case is where the AER model system 124 can be used to recommend a catalog for an off-catalog requisition case. Similar to the recommendation for suppliers in sourcing (or for other fields in a new data record), recommendations for a catalog for an off-catalog requisition follow a similar process. For example, for a new data record for a requisition that is entered where the item is not in the catalog, the AER model system 124 can match the new data record for the requisition with a catalog and recommend a catalog for the requisition. The AER model system 124 can be run in real time to handle a large number of transactions and requisition complexity in which a requisition is happening.

Figure 10A:

FIGS. 10A-10C (split into three figures for readability) illustrate an example 1000 of matching non-catalog items to master data of catalog items. For example, several new data records 1002 are entered for non-catalog items (e.g., notebook computers). These can be matched to master data of catalog items comprising representative data records 1004. In this example, these new data records 1002 are matched to catalog item 223 (representative data record 1006). For example, each new data record of the new data records 1002 is compared to each representative data record 1004 to generate a confidence score 1008 that a new data record 1002 matches a representative data record 1004. A recommendation for a catalog item based on the representative data record 1004 (or a list of top recommendations) can then be provided by the computing system. The computing system can provide the recommendation(s) to the computing device to be displayed on the computing device.

In one example embodiment, the AER model system 124 can provide a recommendation in a dictionary format where the cluster identifier is matched to all of the similar data records in the same cluster, for example:

```
data:
{
        "EventTitle": "bp az pr 374435 provision of switch",
        "CommodityName": null,
        "ItemTitle": null
}
Match_field: None
Result:
{
     "0": {
          "confidence": 0.9358783960342407,
          "canonical": {
                "RowId": "37626",
                "EventTitle": "bp az pr 374431 provision of seal"
                "CommodityName": "miscellaneous equipment",
                "ItemTitle": "testing (for all items combined)",
                "SupplierName": "munasib senaye techizat ltd"
          },
          "clusters": {
                "0": {
                     "Confidence": 0.9930021689608629,
                     "RowId": 13445,
                     "EventTitle": "bp az pr 393558 provision of seal",
                     "CommodityName": "miscellaneous equipment",
                     "ItemTitle": "special packing (for all items combined)",
                     "SupplierName": "providence doytch gmbh, zug"
                },
```

```
        "1": {
            "Confidence": 0.9930021689608629,
            "RowId": 13446,
            "EventTitle": "bp az pr 393558 provision of seal",
            "CommodityName": "miscellaneous equipment",
            "ItemTitle": "testing (for all items combined)",
            "SupplierName": "providence doytch gmbh, zug"
        },
        "2": {
            "Confidence": 0.9930021689608629,
            "RowId": 13447,
            "EventTitle": "bp az pr 393558 provision of seal",
            "CommodityName": "miscellaneous equipment",
            "ItemTitle": "additional certification (for all items combined)",
            "SupplierName": "providence doytch gmbh, zug"
        },
        "3": {
            "Confidence": 0.9930021689608629,
            "RowId": 28476,
            "EventTitle": "bp az pr 383102 provision of sealings",
            "CommodityName": "miscellaneous equipment",
            "ItemTitle": null,
            "SupplierName": "munasib senaye techizat ltd"
        },
        "4": {
            "Confidence": 0.9930021689608629,
            "RowId": 30635,
            "EventTitle": "bp az pr 384601 provision of seal",
            "CommodityName": "miscellaneous equipment",
            "ItemTitle": null,
            "SupplierName": "munasib senaye techizat ltd"
        },
        "5": {
            "Confidence": 0.9930021689608629,
            "RowId": 30636,
            "EventTitle": "bp az pr 384601 provision of seal",
            "CommodityName": "miscellaneous equipment",
            "ItemTitle": null,
            "SupplierName": "weir engineering services"
        },
        "6": {
            "Confidence": 0.9930021689608629,
            "RowId": 37626,
            "EventTitle": "bp az pr 374431 provision of seal",
            "CommodityName": "miscellaneous equipment",
            "ItemTitle": null,
            "SupplierName": "munasib senaye techizat ltd"
        }
    }
  }
}
```

The AER model system 124 further provides for evaluating the accuracy of the result recommendations. For example, when returning one recommendation for a new data record, the AER model system 124 can treat this scenario as a multi-class classification and use metrics designed for this kind of model. For the use case where the top-n recommendations are returned for the new data record, however, to evaluate the recommendation results of the model, top-n metrics are defined by evaluating a true value and the value returned in the top n recommendations.

For example, first the computing system creates a m*m confusion matrix where m equals to the number of possible values for the field that appears in the top n recommendations. The value n is the number of top recommendations that will be considered and can be self-defined. For example, n can be 1 or 3 or 5 or even all the recommendations.

Second, the computing system counts the true positive, true negative, false positive and false negative array from the matrix. For example, the true positive is the diagonal of the confusion matrix.

Third, the computing system calculates the accuracy metrics as an array with length m (e.g., one accuracy score for each possible field value). In one example, four accuracy metrics are used: precision, recall, accuracy and Fscore. These four accuracy metrics are calculated from the true positive (tp), true negative (tn), false positive (fp) and false negative (fn) arrays. An example high level formula includes the following:

$$Precision = tp/(tp+fp)$$

$$Recall = tp/(tp+fn)$$

$$Accuracy = (tn+tp)/(tn+tp+fn+fp)$$

$$Fscore = (1+recall\_weight**2)*recall*precision/(recall+recall\_weight**2*precision)$$

While calculating the F-score, the computing system adjusts the F-score by implementing a recall_weight when the model is trained. The recall_weight defines how the model is to be trained and is a measure of precision and recall. A higher recall_weight means a higher recall and lower precision, and vice versa.

Finally, the computing system calculates the metrics by averaging the array. In one example embodiment, the computing system averages the array using different weights. For example, if one possible field value happens more likely than the others, then it will get higher weights.

Figure 11:
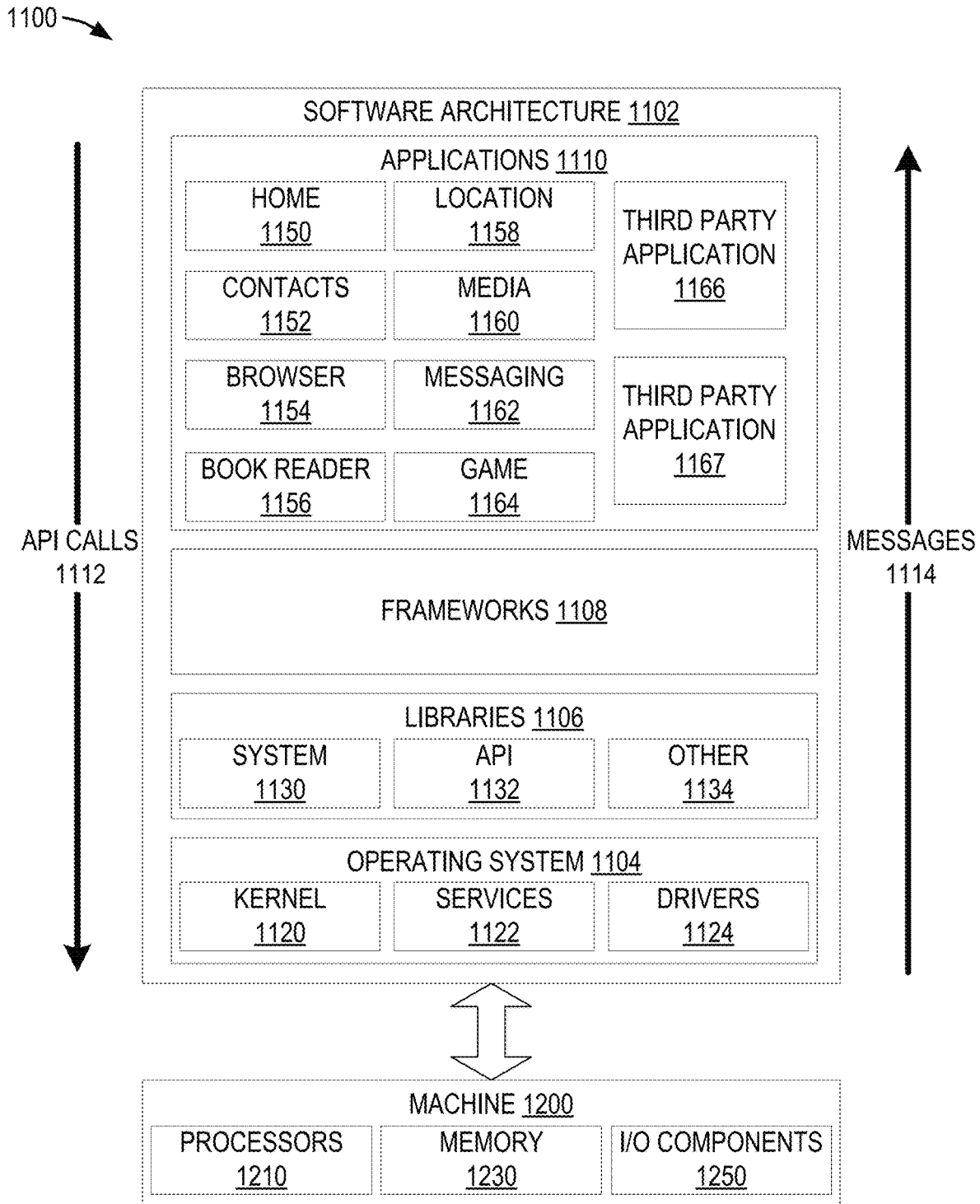
FIG. 11 is a block diagram illustrating an example of a software architecture that may be installed on a machine, according to some example embodiments.

FIG. 11 is a block diagram 1100 illustrating software architecture 1102, which can be installed on any one or more of the devices described above. For example, in various embodiments, client devices 110 and servers and systems 130, 102, 120, 122, and 124 may be implemented using some or all of the elements of software architecture 1102. FIG. 11 is merely a non-limiting example of a software architecture, and it will be appreciated that many other architectures can be implemented to facilitate the functionality described herein. In various embodiments, the software architecture 1102 is implemented by hardware such as machine 1200 of FIG. 12 that includes processors 1210, memory 1230, and I/O components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as third-party applications 1166 and 1167. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
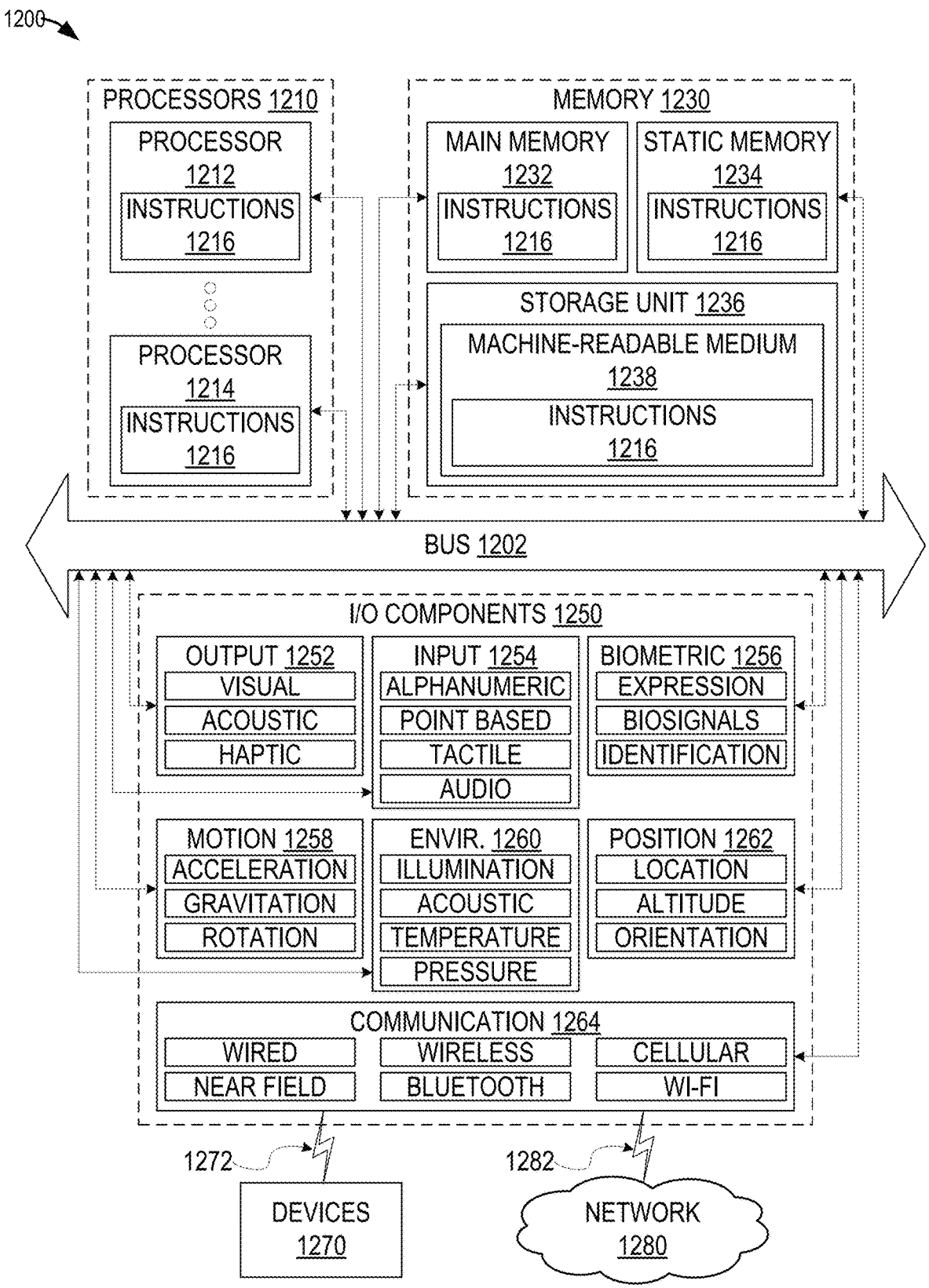
FIG. 12 illustrates a diagrammatic representation of a machine, in the form of a computer system, within which a set of instructions may be executed for causing the machine to perform any one or more of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server machine or system 130, 102, 120, 122, 124, etc., or a client device 110 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1212, 1214 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium 1238 should be considered as being transportable from one physical location to another. Additionally, since the machine-readable medium 1238 is tangible, the medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   training, by a computing system, a machine learning model to generate a trained machine learning model configured to generate a distance score between a new data record and each of a plurality of representative data records, the training using training data based on history sourcing events data records on specified fields of the data records;
   receiving, at a computing system, a request for a recommendation for a missing data field, the request comprising a new data record comprising a first data field with no data for which the recommendation is requested;
   accessing, by the computing system, master data comprising a plurality of representative data records, each representative data record representing a cluster of similar data records, and each similar data record having a confidence score indicating a confidence level that the similar data record corresponds to the cluster;
   comparing the new data record to each representative data record of the plurality of representative data records using the trained machine learning model to generate a distance score, for each representative data record, corresponding to a distance between the new data record and each representative data record;
   selecting a set of representative data records having a generated distance score within a distance threshold of the new data record;
   generating candidate values for the first data field with no data of the new data record by selecting, as a candidate value, a value of a second data field, in each record of the cluster of similar data records for each representative data record, that corresponds to the first data field;
   generating a candidate score for each of the candidate values for the first data field with no data using the distance score for the representative data record representing the cluster of similar records to which the candidate value corresponds, and the confidence score for the similar data record to which the candidate value corresponds; and
   providing a predefined number of recommendations for the first data field with no data based on the candidate scores for the candidate values.

2. The computer-implemented method of claim 1, wherein the first data field with no data is a supplier name or catalog data field.

3. The computer-implemented method of claim 1, wherein the master data is generated by performing operations comprising:
   accessing a data source comprising a plurality of data records;
   grouping the data records into clusters comprising similar data records;
   generating a representative data record to represent each cluster of similar data records;
   generating a confidence score for each similar data record indicating the confidence level that the similar data record corresponds to the cluster; and
   storing the master data comprising the plurality of representative data records in one or more data stores.

4. The computer-implemented method of claim 1, wherein the distance threshold is a specified value and the set of representative data records are selected based on each representative record of the set of representative data records having a distance score greater than the specified value for the distance threshold.

5. The computer-implemented method of claim 1, wherein generating the candidate score for each of the candidate values for the first data field with no data using the distance score for the representative data record representing the cluster of similar records to which the candidate value corresponds and the confidence score for the similar data record to which the candidate value corresponds comprises:
   for each similar data record, multiplying the distance score by the confidence score to generate a multiplied value;
   for each candidate value, combining the multiplied value of each similar data record comprising the candidate value to generate a combined multiplied value;
   determining a count of a number of similar data records in which each candidate value appears; and
   generating the candidate score for each of the candidate values based on the combined multiplied value and the count for the candidate value.

6. The computer-implemented method of claim 1, further comprising:
   ranking the candidate values based on the candidate score; and
   wherein the predefined number of recommendations for the first data field with no data is provided based on the ranked candidate values.

7. The computer-implemented method of claim 6, wherein ranking the candidate values based on the candidate score comprises ranking the candidate values first based on candidate score, second based on cluster count indicating a number of clusters in which the candidate value appears, and third based on record count indicating a number of similar records in which the candidate value appears.

8. The computer-implemented method of claim 1, wherein providing the predefined number of recommendations for the first data field with no data based on the candidate scores for the candidate values comprises providing a candidate value with a highest candidate score as a first recommendation for the first data field with no data.

9. The computer-implemented method of claim 7, wherein providing the predefined number of recommendations for the first data field with no data based on the ranked candidate values comprises providing a subset of the candidate values with highest candidate scores based on the predetermined number of recommendations to be provided.

10. A system comprising:
   a machine-readable medium that stores instructions; and
   one or more processors configured by the instructions to perform operations comprising:
      training a machine learning model to generate a trained machine learning model configured to generate a distance score between a new data record and each of a plurality of representative data records, the training using training data based on history sourcing events data records on specified fields of the data records;
      receiving a request for a recommendation for a missing data field, the request comprising a new data record comprising a first data field with no data for which the recommendation is requested;
      accessing master data comprising a plurality of representative data records, each representative data record representing a cluster of similar data records, and each similar data record having a confidence score indicating a confidence level that the similar data record corresponds to the cluster;

comparing the new data record to each representative data record of the plurality of representative data records using the trained machine learning model to generate a distance score, for each representative data record, corresponding to a distance between the new data record and each representative data record;

selecting a set of representative data records having a generated distance score within a distance threshold of the new data record;

generating candidate values for the first data field with no data of the new data record by selecting, as a candidate value, a value of a second data field, in each record of the cluster of similar data records for each representative data record, that corresponds to the first data field;

generating a candidate score for each of the candidate values for the first data field with no data using the distance score for the representative data record representing the cluster of similar records to which the candidate value corresponds, and the confidence score for the similar data record to which the candidate value corresponds; and providing a predefined number of recommendations for the first data field with no data based on the candidate scores for the candidate values.

11. The system of claim 10, wherein the first data field with no data is a supplier name or catalog data field.

12. The system of claim 10, wherein the master data is generated by performing operations comprising:

accessing a data source comprising a plurality of data records;

grouping the data records into clusters comprising similar data records;

generating a representative data record to represent each cluster of similar data records;

generating a confidence score for each similar data record indicating the confidence level that the similar data record corresponds to the cluster; and storing the master data comprising the plurality of representative data records in one or more data stores.

13. The system of claim 10, wherein the distance threshold is a specified value and the set of representative data records are selected based on each representative record of the set of representative data records having a distance score greater than the specified value for the distance threshold.

14. The system of claim 10, wherein generating the candidate score for each of the candidate values for the first data field with no data using the distance score for the representative data record representing the cluster of similar records to which the candidate value corresponds and the confidence score for the similar data record to which the candidate value corresponds comprises:

for each similar data record, multiplying the distance score by the confidence score to generate a multiplied value;

for each candidate value, combining the multiplied value of each similar data record comprising the candidate value to generate a combined multiplied value;

determining a count of a number of similar data records in which each candidate value appears; and generating the candidate score for each of the candidate values based on the combined multiplied value and the count for the candidate value.

15. The system of claim 10, the operations further comprising:

ranking the candidate values based on the candidate score; and wherein the predefined number of recommendations for the first data field with no data is provided based on the ranked candidate values.

16. The system of claim 15, wherein ranking the candidate values based on the candidate score comprises ranking the candidate values first based on candidate score, second based on cluster count indicating a number of clusters in which the candidate value appears, and third based on record count indicating a number of similar records in which the candidate value appears.

17. The system of claim 15, wherein providing the predefined number of recommendations for the first data field with no data based on the ranked candidate values comprises providing a subset of the candidate values with highest candidate scores based on the predetermined number of recommendations to be provided.

18. The system of claim 10, wherein providing the predefined number of recommendations for the first data field with no data based on the candidate scores for the candidate values comprises providing a candidate value with a highest candidate score as a first recommendation for the first data field with no data.

19. A non-transitory computer-readable medium comprising instructions stored thereon that are executable by at least one processor to cause a computing device to perform operations comprising:

training a machine learning model to generate a trained machine learning model configured to generate a distance score between a new data record and each of a plurality of representative data records, the training using training data based on history sourcing events data records on specified fields of the data records;

receiving a request for a recommendation for a missing data field, the request comprising a new data record comprising a first data field with no data for which the recommendation is requested;

accessing master data comprising a plurality of representative data records, each representative data record representing a cluster of similar data records, and each similar data record having a confidence score indicating a confidence level that the similar data record corresponds to the cluster;

comparing the new data record to each representative data record of the plurality of representative data records using the trained machine learning model to generate a distance score, for each representative data record, corresponding to a distance between the new data record and each representative data record;

selecting a set of representative data records having a generated distance score within a distance threshold of the new data record;

generating candidate values for the first data field with no data of the new data record by selecting, as a candidate value, a value of a second data field, in each record of the cluster of similar data records for each representative data record, that corresponds to the first data field;

generating a candidate score for each of the candidate values for the first data field with no data using the distance score for the representative data record representing the cluster of similar records to which the candidate value corresponds, and the confidence score for the similar data record to which the candidate value corresponds; and providing a predefined number of recommendations for the first data field with no data based on the candidate scores for the candidate values.

20. The non-transitory computer-readable medium of claim 19, wherein generating the candidate score for each of the candidate values for the first data field with no data using the distance score for the representative data record representing the cluster of similar records to which the candidate value corresponds and the confidence score for the similar data record to which the candidate value corresponds comprises:
   for each similar data record, multiplying the distance score by the confidence score to generate a multiplied value;
   for each candidate value, combining the multiplied value of each similar data record comprising the candidate value to generate a combined multiplied value;
   determining a count of a number of similar data records in which each candidate value appears; and
   generating the candidate score for each of the candidate values based on the combined multiplied value and the count for the candidate value.

\* \* \* \* \*